United States Patent
Wyville (10) Patent No.: US 9,882,603 B2
(45) Date of Patent: Jan. 30, 2018

(54) ACTIVE CANCELLATION OF TRANSMITTER LEAKAGE IN A RADIO RECEIVER

(71) Applicant: Telefonaktiebolaget LM Ericsson (publ), Stockholm (SE)

(72) Inventor: Mark Wyville, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/314,465

(22) PCT Filed: Jun. 10, 2014

(86) PCT No.: PCT/IB2014/062112
§ 371 (c)(1),
(2) Date: Nov. 28, 2016

(87) PCT Pub. No.: WO2015/189657
PCT Pub. Date: Dec. 17, 2015

(65) Prior Publication Data
US 2017/0207812 A1    Jul. 20, 2017

(51) Int. Cl.
*H04B 1/525*     (2015.01)
*H04L 5/14*      (2006.01)

(52) U.S. Cl.
CPC .............. *H04B 1/525* (2013.01); *H04L 5/14* (2013.01)

(58) Field of Classification Search
CPC .................................. H04B 1/525; H04B 1/40
See application file for complete search history.

(56) References Cited

U.S. PATENT DOCUMENTS 4,725,842 A    2/1988  Mayberry
8,027,642 B2 * 9/2011  Proctor, Jr. ........ H04B 7/15585
                                                370/279

(Continued)

FOREIGN PATENT DOCUMENTS

WO    2014075980 A1    5/2014

OTHER PUBLICATIONS

Schacherbauer, W., et al., "An Interference Cancellation Technique for the Use in Multiband Software Radio Frontend Design," 30th European Microwave Conference, Oct. 2000, IEEE, 4 pages.

(Continued)

*Primary Examiner* — Tuan H Nguyen
(74) *Attorney, Agent, or Firm* — Patent Portfolio Builders, PLLC (57) ABSTRACT

Systems and methods are disclosed for active cancellation of transmitter leakage in a radio receiver that reduce power consumption and/or reduce noise in a desired receive frequency band. In some embodiments, in order to cancel transmitter leakage in a receive path, a cancellation signal is injected into the receive path in an upstream direction. By injecting the cancellation signal in the upstream direction, a noise component of the cancellation signal propagates through the receive path in the upstream direction and is either passed through a receive antenna or attenuated by an upstream component. Conversely, a desired component of the cancellation signal is reflected by an upstream filter and, thereafter, propagates through the receive path in the downstream direction to thereby cancel the transmitter leakage in the receive path. In this manner, active transmitter leakage cancellation can be performed while minimizing degradation of receiver sensitivity.

18 Claims, 12 Drawing Sheets

(56) References Cited

U.S. PATENT DOCUMENTS

| | | |
|---|---|---|
| 8,175,535 B2 | 5/2012 | Mu |
| 2008/0198772 A1* | 8/2008 | Loh .................. H04B 1/525 |
| | | 370/277 |
| 2013/0188528 A1 | 7/2013 | Wyville |

OTHER PUBLICATIONS

International Search Report and Written Opinion for International Patent Application No. PCT/IB2014/062112, dated Feb. 16, 2015, 11 pages.

\* cited by examiner

ACTIVE CANCELLATION OF TRANSMITTER LEAKAGE IN A RADIO RECEIVER

This application is a 35 U.S.C. § 371 national phase filing of International Application No. PCT/IB2014/062112, filed Jun. 10, 2014, the disclosure of which is incorporated herein by reference in its entirety.

FIELD OF THE DISCLOSURE

The present disclosure relates to active cancellation of transmitter leakage in a radio receiver.

BACKGROUND

Wireless communications systems operate according to either a Time Division Duplexing (TDD) scheme or a Frequency Division Duplexing (FDD) scheme. For the FDD scheme, full duplex operation is typically desired, i.e., a radio transceiver is required to simultaneously transmit and receive in different frequency bands, which are referred to as a Transmit (TX) frequency band and a Receive (RX) frequency band, respectively. However, because the radio transmitter typically outputs signals at a power level that is much higher than that of desired signals received by the radio receiver, the radio receiver typically suffers from self-interference, or leakage, from the radio transmitter. In particular, a duplexer is often used to allow the radio transmitter and the radio receiver to share the same antenna. However, the duplexer provides limited isolation between the radio transmitter and the radio receiver. As such, transmitter leakage occurs from the radio transmitter to the radio receiver through the duplexer. Transmitter leakage may also occur even in implementations where the radio transmitter and the radio receiver are not directly connected (i.e., there is no duplexer and no antenna sharing between the radio transmitter and the radio receiver) or may also occur due to crosstalk leaking through integrated circuit substrates, device packages, or printed circuit boards.

Transmitter leakage decreases the sensitivity of the radio receiver. In particular, even though the transmitter leakage is in the TX frequency band, due to non-linear components in the radio receiver, the transmitter leakage can result in distortion in the RX frequency band. This distortion in the RX frequency band decreases the sensitivity of the radio receiver.

Techniques have been proposed that use active cancellation to cancel transmitter leakage. For example, U.S. Pat. No. 8,175,535 B2, entitled ACTIVE CANCELLATION OF TRANSMITTER LEAKAGE IN A WIRELESS TRANSCEIVER, which issued on May 8, 2012, describes systems and methods for active transmitter leakage cancellation. In one embodiment, a Radio Frequency (RF) cancellation signal is generated from a transmitter signal, and the RF cancellation signal is combined with a RF received signal to obtain a combined RF signal including residual transmitter leakage. The magnitude and phase of the RF cancellation signal are adjusted to reduce the residual transmitter leakage.

Figure 1:
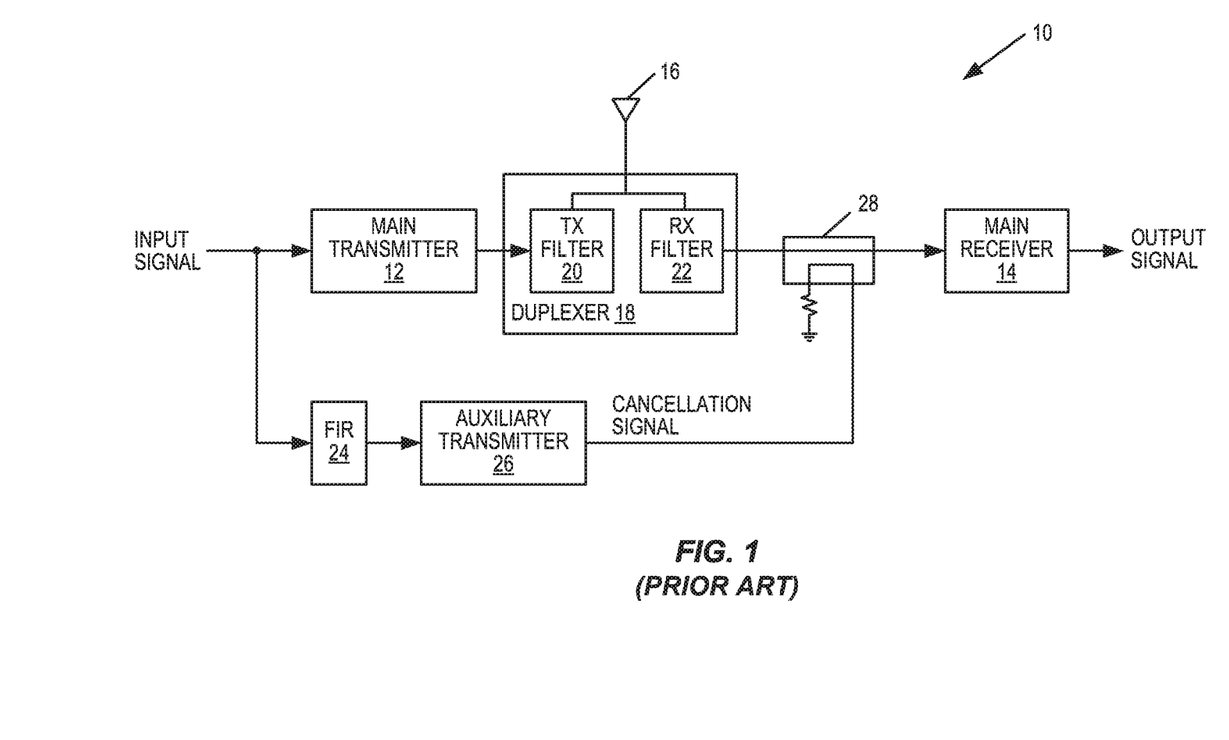
FIG. 1 illustrates a radio system that performs active transmitter leakage cancellation.

Similarly, in W. Schacherbauer et al., "An Interference Cancellation Technique for the Use in Multiband Software Radio Frontend Design," 30$^{th}$ European Microwave Conference, October 2000, pages 1-4 (hereinafter the "Schacherbauer article"), the authors describe an active transmitter leakage cancellation scheme that utilizes an auxiliary transmit chain to generate an RF cancellation signal that is then combined with the RF receive signal to thereby cancel the transmitter leakage. The system disclosed in the Schacherbauer article can be illustrated as shown in FIG. 1. In particular, a wireless transceiver 10 includes a main transmitter 12 and a main receiver 14 that are connected to an antenna 16 via a duplexer 18. The duplexer 18 is also known as a duplex filter. The duplexer 18 includes a TX filter 20 that passes a RF transmit signal output by the main transmitter 12 to the antenna 16 and a RX filter 22 that passes a RF received signal from the antenna 16 to the main receiver 14. A Finite Impulse Response (FIR) filter 24 and an auxiliary transmitter 26 process the same input signal as that provided to the main transmitter 12 to generate a cancellation signal. A directional coupler 28 combines the cancellation signal and a RF receive signal output by the RX filter 22 of the duplexer 18 to provide a compensated RF receive signal in which the transmitter leakage has been reduced. The FIR 24 is designed to have a transfer function that models the transmitter chain components including antenna reflections.

The active cancellation scheme the Schacherbauer article relies on combines a cancellation signal with the RF receive signal to thereby cancel, or reduce, transmitter leakage. One issue that arises from these schemes is that a directional coupler has a coupling factor of, e.g., 10-20 Decibels (dB). As such, in order to overcome the coupling factor of the directional coupler 28, an output power of the auxiliary transmitter 26 must be larger than the actual leakage signal by the coupling factor of the directional coupler 28. As the output power of the auxiliary transmitter 26 increases, the power consumption of the wireless transceiver 10 also increases. Another issue that arises is that, due to, e.g., non-linear components in the auxiliary transmitter 26, the cancellation signal includes noise in the RX frequency band. This noise in the RX frequency band is injected into the main receiver 14, which can potentially degrade the sensitivity of the main receiver 14.

Thus, there is a need for systems and methods for active cancellation of transmitter leakage that reduces power consumption and/or reduces noise in the RX frequency band.

SUMMARY

Systems and methods are disclosed for active cancellation of transmitter leakage in a radio receiver that reduce power consumption, reduce noise in a desired receive frequency band, or both. In some embodiments, in order to cancel, or mitigate, transmitter leakage in a receive path, a transmitter leakage cancellation signal is injected into the receive path in an upstream, or reverse, direction. By injecting the transmitter leakage cancellation signal in the upstream direction, a noise component of the transmitter leakage cancellation signal propagates through the receive path in the upstream direction and is either passed through a receive antenna or attenuated by an upstream component. Conversely, a desired component of the transmitter leakage cancellation signal is reflected by an upstream filter and, thereafter propagates through the receive path in the downstream direction to thereby cancel, or mitigate, the transmitter leakage in the receive path. In this manner, active transmitter leakage cancellation can be performed while minimizing degradation of receiver sensitivity.

In one embodiment, a radio system includes a receive path including a receive filter in the receive path having a pass-band that corresponds to a desired receive frequency band. In addition, the receive path includes injection circuitry downstream of the receive filter in the receive path, where the injection circuitry injects a transmitter leakage cancellation signal into the receive path in an upstream direction. As used herein, the upstream direction in the receive path is the direction in the receive path that is opposite to the direction in the receive path propagated by a desired receive signal (i.e., a direction toward an associated receive antenna or input of the receive path as opposed to a direction toward an output of the receive path). The injection circuitry injects the transmitter leakage cancellation signal into the receive path in the upstream direction such that a noise component of the transmitter leakage cancellation signal in the pass-band of the receive filter passes through the receive filter in the upstream direction and a desired component of the transmitter leakage cancellation signal is reflected by the receive filter and propagated downstream through the receive path. By injecting the transmitter leakage cancellation signal in this manner, transmitter leakage from an associated radio transmitter is cancelled, or mitigated, and a sensitivity of a radio receiver in the receive path is not degraded by the noise component of the transmitter leakage cancellation signal.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for active cancellation of transmitter leakage in a radio receiver that reduce power consumption, reduce noise in a desired receive frequency band, or both. In some embodiments, in order to cancel, or mitigate, transmitter leakage in a receive path, a transmitter leakage cancellation signal (hereinafter referred to simply as "cancellation signal") is injected into the receive path in an upstream, or reverse, direction. By injecting the cancellation signal in the upstream direction, a noise component of the cancellation signal propagates through the receive path in the upstream direction and is either passed through a receive antenna or attenuated by an upstream component. Conversely, a desired component of the cancellation signal is reflected by an upstream filter and thereafter propagates through the receive path in the downstream direction to thereby cancel, or mitigate, the transmitter leakage in the receive path. In this manner, active transmitter leakage cancellation can be performed while minimizing degradation of receiver sensitivity.

Figure 2:
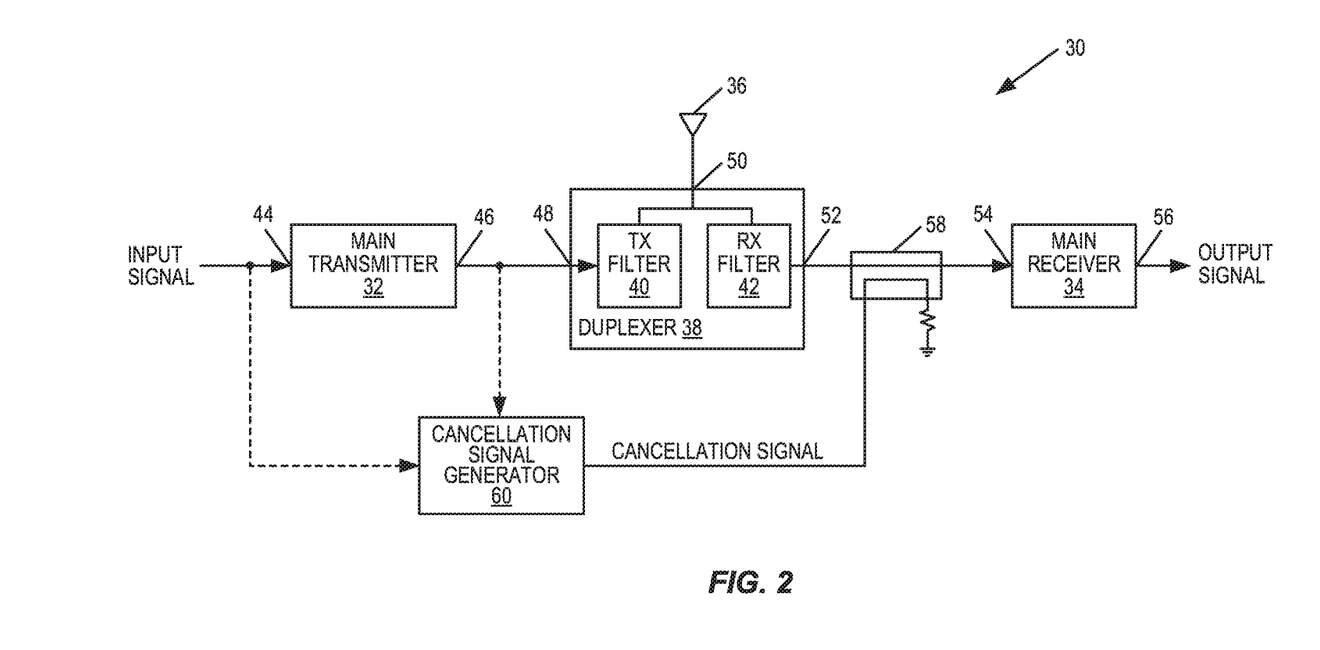
FIG. 2 illustrates a radio system that performs active transmitter leakage cancellation by injecting a transmitter leakage cancellation signal into the receive path in an upstream, or reverse, direction according to one embodiment of the present disclosure.

In this regard, FIG. 2 illustrates a radio system 30 that performs active transmitter leakage cancellation by injecting a transmitter leakage cancellation signal into the receive path in an upstream, or reverse, direction according to one embodiment of the present disclosure. The radio system 30 may be implemented as a wireless transceiver in a wireless system such as, for example, a cellular communications network. In a cellular communications network, the radio system 30 may be implemented in a wireless device (e.g., a mobile device, a User Equipment device (UE), etc.) or a radio access node (e.g., a base station, a relay, etc.).

As illustrated, the radio system 30 includes a main transmitter 32 and a main receiver 34 that are connected to an antenna 36 via a duplexer 38. The duplexer 38 includes a Transmit (TX) filter 40 and a Receive (RX) filter 42. The TX filter 40 is a band-pass filter having a pass-band that corresponds to a desired TX frequency band. The RX filter 42 is a band-pass filter having a pass-band that corresponds to a desired RX frequency band. The main transmitter 32 includes circuitry (e.g., a Digital-to-Analog Converter (DAC), mixer(s), filter(s), a power amplifier, etc.) that processes an input signal received at an input 44 of the main transmitter 32 to provide a Radio Frequency (RF) transmit signal at an output 46 of the main transmitter 32. The output 46 of the main transmitter 32 is coupled to a TX port 48 of the duplexer 38. An antenna port 50 of the duplexer 38 is coupled to the antenna 36. Thus, in operation, the input signal is processed by the main transmitter 32 to provide the RF transmit signal. The RF transmit signal is passed through the TX filter 40 of the duplexer 38 to the antenna 36. Most of the RF transmit signal goes through the TX filter 40 and out the antenna 36. However, some of the RF transmit signal, which is a high power signal, leaks through the duplexer 38 to an RX port 52 of the duplexer 38. This can be due to, e.g., finite TX-RX isolation of the duplexer 38 and can be further exacerbated by imperfect impedance matching at the antenna 36.

The main receiver 34 includes circuitry (e.g., an amplifier, mixer(s), filter(s), an Analog-to-Digital Converter (ADC), etc.) that processes an RF receive signal (more specifically a compensated RF receive signal, as discussed below) received at an input 54 of the main receiver 34 to provide a digital (preferably baseband) output signal at an output 56 of the main receiver 34. In this embodiment, the input 54 of the main receiver 34 is coupled to the RX port 52 of the duplexer 38 via a directional coupler 58. The directional coupler 58 operates to inject a cancellation signal into the receive path to thereby cancel transmitter leakage from the main transmitter 32 (e.g., transmitter leakage through the duplexer 38). The cancellation signal is generated by a cancellation signal generator 60. The cancellation signal generator 60 is generally any hardware or combination of hardware and software that generates the cancellation signal to cancel the transmitter leakage. While not essential, one example of the cancellation signal generator 60 is described in W. Schacherbauer et al., "An Interference Cancellation Technique for the Use in Multiband Software Radio Frontend Design," 30$^{th}$ European Microwave Conference, October 2000, pages 1-4. However, the present disclosure is not limited thereto. Any suitable technology may be used.

The cancellation signal includes a desired component for cancelling the transmitter leakage and an undesired noise component. In this example, since the insertion of the cancellation signal is performed at RF, the desired component is located in the desired TX frequency band, and the undesired noise component is located in the desired RX frequency band. For example, the undesired noise component may result from non-linear or non-ideal components in the cancellation signal generator 60 used to generate the cancellation signal.

Importantly, the directional coupler 58 is connected such that the directional coupler 58 injects the cancellation signal in the upstream, or reverse, direction in the receive path. As used herein, the "receive path" is the path from the receive antenna (which in this embodiment is the antenna 36) to the output 56 of the main receiver 34. Further, the "upstream direction" or "reverse direction" in the receive path is the direction that is opposite to the direction of propagation of the desired receive signal and the transmitter leakage. Thus, in this example, the directional coupler 58 injects the cancellation signal into the receive path in the direction of the RX port 52 of the duplexer 38. As a result, the undesired noise component (in the desired RX frequency band) passes through the RX filter 42 of the duplexer 38 and out the antenna 36. Conversely, the desired component of the cancellation signal is reflected (preferably strongly reflected) by the RX filter 42 of the duplexer 38 since the desired component of the cancellation signal is not within the pass-band of the RX filter 42. As used herein, "strongly reflected" means that more of the desired component (in the TX frequency band) of the cancellation signal is reflected than the undesired noise component (in the RX frequency band). In one embodiment, more than 90% of the power of the desired component (in the TX frequency band) is reflected.

Once reflected, the desired component of the cancellation signal propagates through the receive path in the downstream, or forward, direction. The desired component of the cancellation signal combines with the RF receive signal, where the cancellation signal generator 60 adjusts the cancellation signal (e.g., a magnitude and phase of the cancellation signal) such that the desired component of the cancellation signal cancels the transmitter leakage. The cancellation signal generator 60 takes into account the fact that the desired component of the cancellation signal is injected in the upstream direction and is then reflected. For example, in one embodiment, the cancellation signal generator 60 includes a tunable functionality (e.g., a digital Finite Impulse Response (FIR) filter), where this tunable functionality if adjusted such that the paths taken by the transmitter leakage and the path of the cancellation signal are approximately equal in magnitude and opposite in phase over, in this example, the RF transmit signal bandwidth. Notably, as used herein, "cancelling" the transmitter leakage is defined as completely or partially cancelling the transmitter leakage. Normally, since no cancellation scheme is perfect, there will be residual transmitter leakage after cancellation. However, the cancellation signal generator 60 generally operates to reduce or minimize the residual transmitter leakage.

Figure 3A:
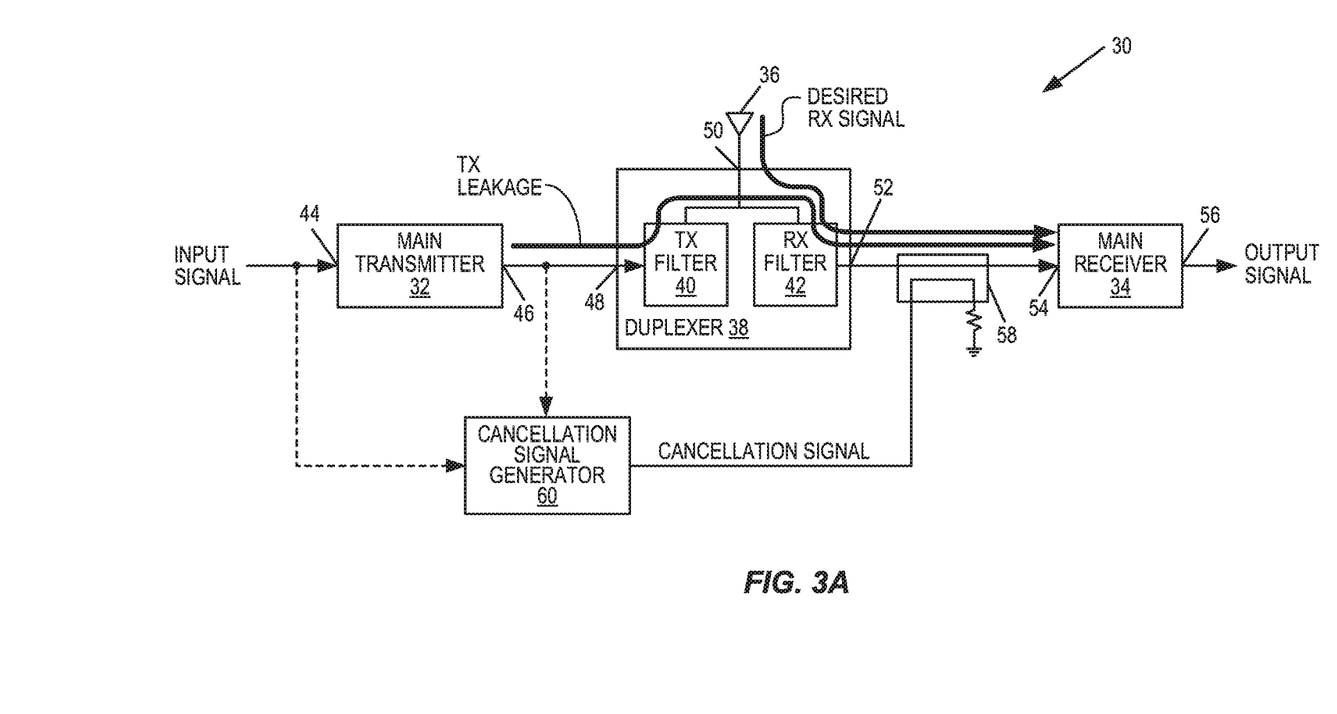
FIGS. 3A and 3B illustrate transmitter leakage, a desired receive signal, and the injection of the transmitter leakage cancellation signal in the radio system of FIG. 2 according to one embodiment of the present disclosure.
Figure 3B:
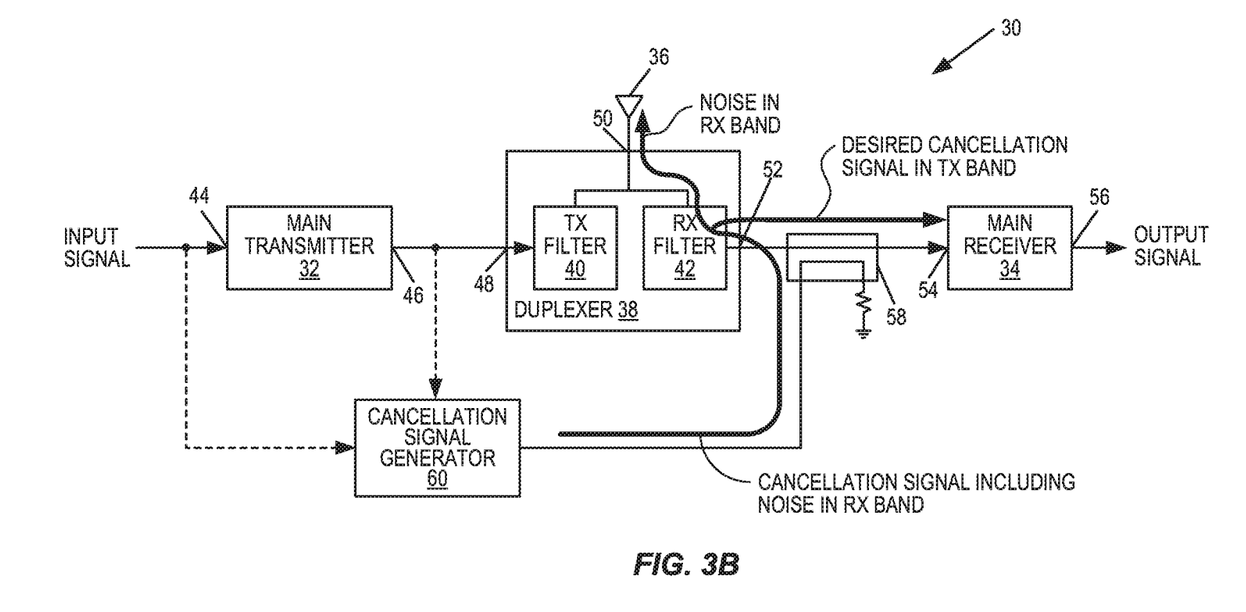

FIGS. 3A and 3B graphically illustrate the operation of the radio system 30 of FIG. 2. More specifically, FIG. 3A illustrates the transmitter (TX) leakage, which in this example is a result of the RF transmit signal leaking through the duplexer 38 into the receive path (i.e., from the TX port 48 to the RX port 52 of the duplexer 38). In addition, a desired RF receive signal passes from the antenna 36 and through the duplexer 38 (i.e., from the antenna port 50 of the duplexer 38 to the RX port 52 of the duplexer 38). As illustrated in FIG. 3B, in order to cancel the transmitter leakage in the receive path, the cancellation signal generator 60 generates the cancellation signal. The cancellation signal is then injected into the receive path in the upstream direction by the directional coupler 58. The undesired noise in the desired RX frequency band passes through the RX filter 42 of the duplexer 38 (i.e., from the RX port 52 to the antenna port 50) and out the antenna 36. In this manner, the undesired noise will not degrade the receiver noise floor (i.e., will not degrade the sensitivity of the main receiver 34). Note that, in some embodiments, the emission requirements in the RX frequency band are less stringent than the sensitivity requirements of the main receiver 34. Conversely, the desired component of the cancellation signal in the desired TX frequency band is reflected by the RX filter 42 of the duplexer 38 and then propagates through the receive path in the downstream direction. The cancellation signal generator 60 provides the cancellation signal such that the desired component of the cancellation signal cancels the transmitter leakage.

Figure 4:
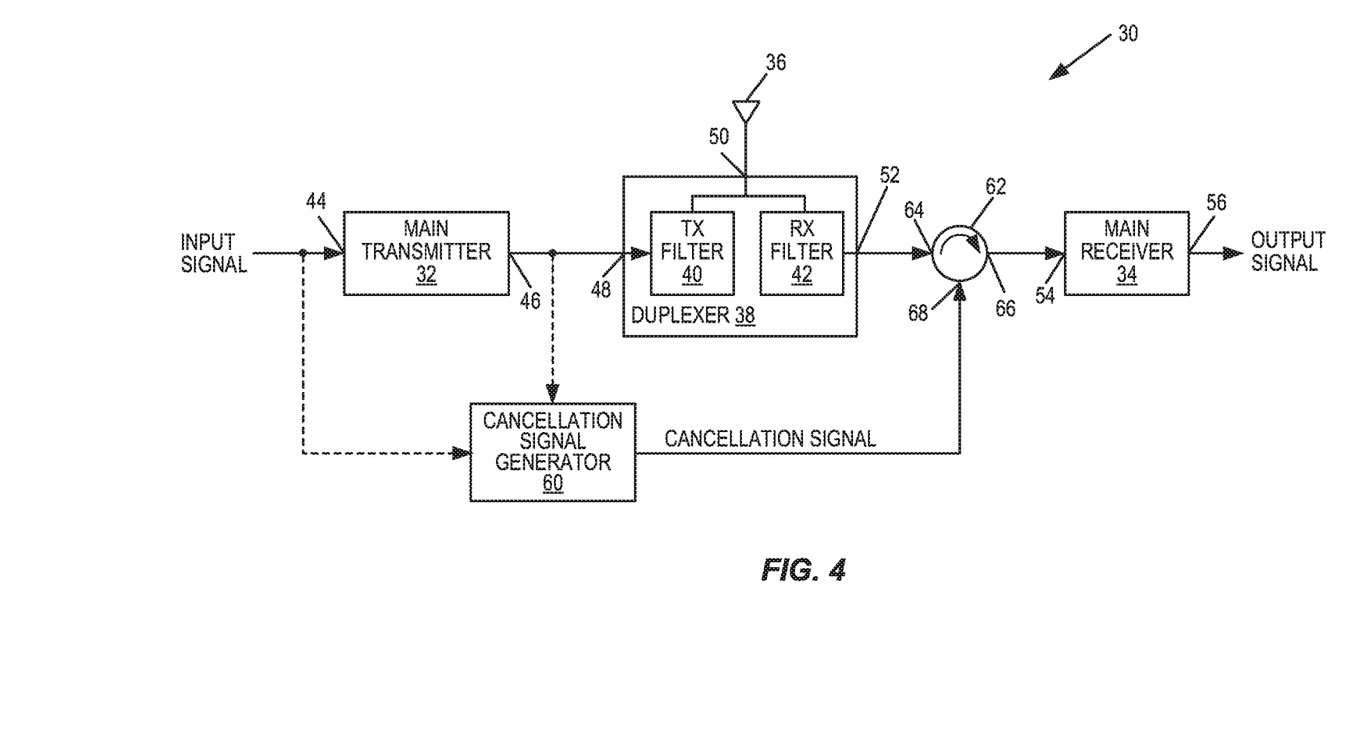
FIG. 4 illustrates a radio system that performs active transmitter leakage cancellation by injecting a transmitter leakage cancellation signal into the receive path in an upstream, or reverse, direction according to another embodiment of the present disclosure.

FIG. 4 illustrates the radio system 30 according to another embodiment of the present disclosure. This embodiment is substantially the same as that of FIG. 2 but where the directional coupler 58 is replaced with a circulator 62. The circulator 62 is arranged such that the circulator 62 injects the cancellation signal into the receive path in the upstream direction. In particular, the circulator 62 includes ports 64, 66, and 68. In operation, the circulator 62 operates such that the cancellation signal enters the port 68 and comes out the port 64, and the RF receive signal and the reflected desired component of the cancellation signal enter the port 64 and come out the port 66. In this manner, the signal output from the port 66 is a compensated version of the RF receive signal (i.e., a compensated RF receive signal) in which the transmitter leakage has been cancelled.

Notably, in addition to removing the undesired noise component of the cancellation signal, the embodiment of FIG. 4 provides the additional advantage of reducing the required average power of the cancellation signal. In particular, the directional coupler 58 of FIG. 2 has a coupling factor (e.g., 10 or 20 Decibels (dB)) that must be overcome by the average power of the cancellation signal. In contrast, the insertion loss of the circulator 62 is relatively small, which in turn reduces the required average power of the cancellation signal.

Figure 5:
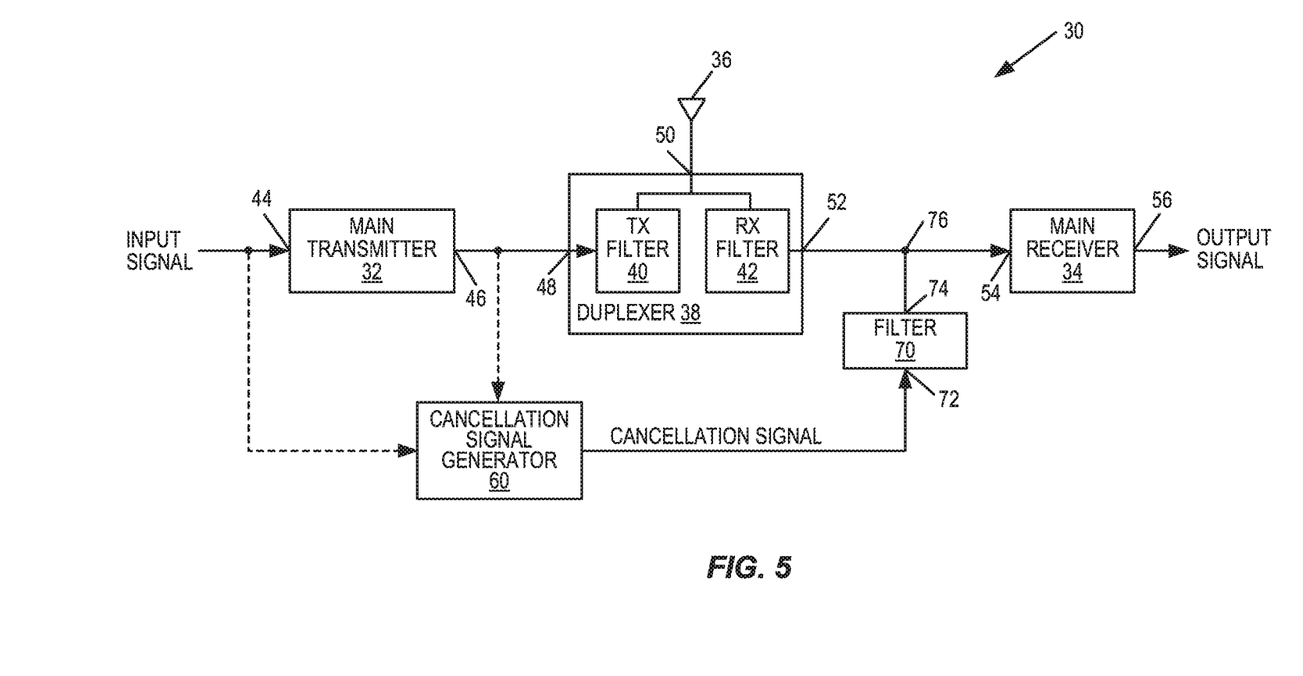
FIG. 5 illustrates a radio system that performs active transmitter leakage cancellation in which a filter is utilized to remove, or mitigate, noise in the transmitter leakage cancellation signal prior to inserting the transmitter leakage cancellation signal into the receive path according to one embodiment of the present disclosure.

In the embodiments of FIGS. 2 and 4, the undesired component of the cancellation signal in the desired RX frequency band is removed, or attenuated, by injecting the cancellation signal in the upstream direction toward the RX filter 42. FIG. 5 illustrates the radio system 30 according to another embodiment in which the undesired component of the cancellation signal in the desired RX frequency band is removed by a filter 70 prior to injecting the cancellation signal into the receive path. As illustrated, in this embodiment, the radio system 30 does not include the directional coupler 58 (FIG. 2) or the circulator 62 (FIG. 4). Rather, the radio system 30 includes the filter 70 including an input 72 that receives the cancellation signal and an output 74 that is directly coupled to a point 76 in the receive path that is, in this example, between the RX filter 42 and the main receiver 34. In general, the filter 70 prevents a significant amount of the undesired noise (located in the desired RX frequency band) in the cancellation signal from entering the receive path. In one embodiment, the filter 70 is a band-stop filter having a stop-band over the desired RX frequency band. In another embodiment, the filter 70 is a band-pass filter having a pass-band that corresponds to the desired TX frequency band.

In operation, rather than injecting the cancellation signal into the receive path in the upstream direction, the filter 70 filters the cancellation signal to remove, or attenuate, the undesired noise component in the desired RX frequency band. The resulting filtered cancellation signal is combined with the RF receive signal at the point 76 in the receive path. In particular, after filtering, the attenuated undesired noise component is equally split into the upstream and downstream directions at the point 76 in the receive path (i.e., half goes to the RX filter 42 and out the antenna 36 and half goes to the main receiver 34). The desired component of the cancellation signal in the desired TX frequency band propagates in the downstream direction since the RX filter 42 is not impedance matched with the main receiver 34 or cancellation path output in the desired TX frequency band.

Figure 6:
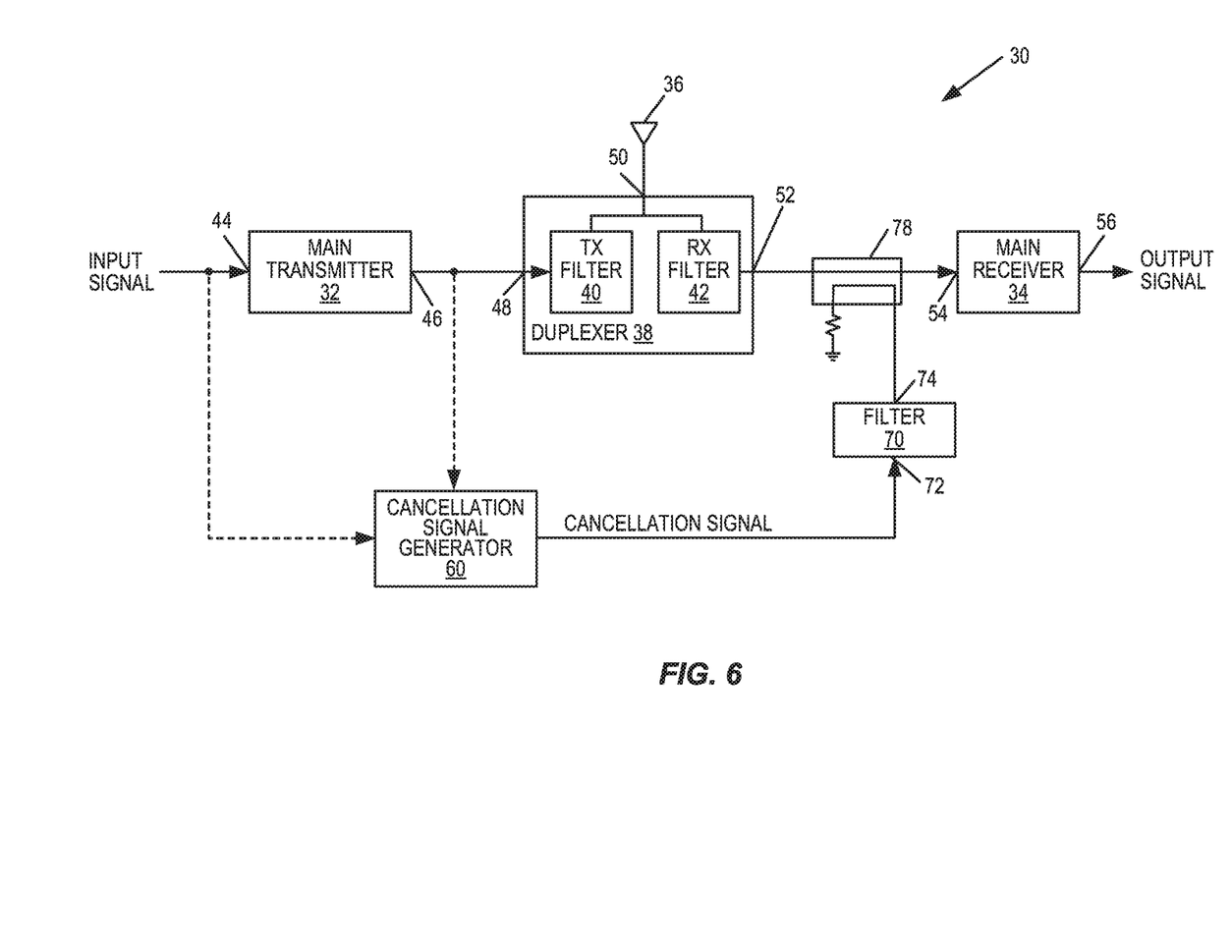
FIG. 6 illustrates a radio system that performs active transmitter leakage cancellation in which a filter is utilized to remove, or mitigate, noise in the transmitter leakage cancellation signal prior to inserting the transmitter leakage cancellation signal into the receive path according to another embodiment of the present disclosure.

FIG. 6 illustrates the radio system 30 according to another embodiment in which radio system 30 utilizes both the filter 70 and a directional coupler 78 that injects the filtered cancellation signal in the downstream direction. As illustrated, in this embodiment, the output 74 of the filter 70 is connected to the directional coupler 78. The directional coupler 78 is connected such that the filtered cancellation signal (including the desired component in the desired TX frequency band and the attenuated noise in the RX frequency band) is injected into the receive path in the downstream direction. The desired component of the cancellation signal combines with the RF receive signal to cancel the transmitter leakage.

Figure 7:
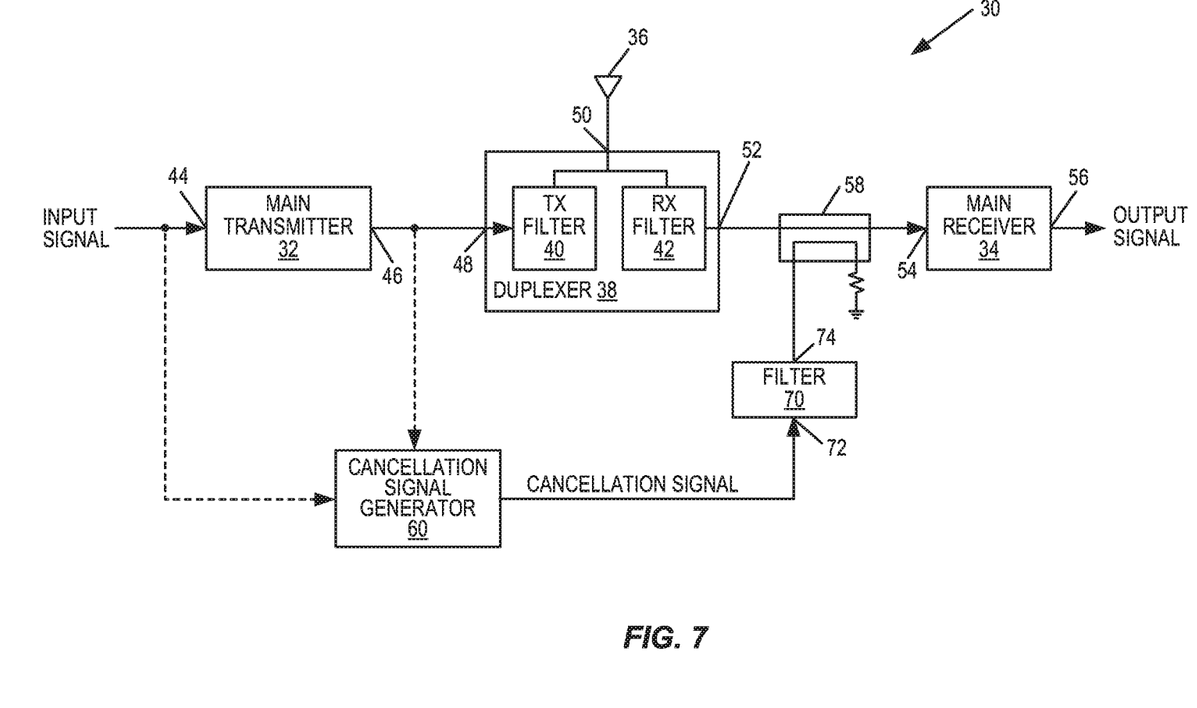
FIG. 7 illustrates a radio system that performs active transmitter leakage cancellation in which a filter is utilized to remove, or mitigate, noise in the transmitter leakage cancellation signal prior to inserting the transmitter leakage cancellation signal into the receive path in an upstream, or reverse, direction according to one embodiment of the present disclosure.

FIG. 7 illustrates yet another embodiment of the radio system 30 that includes both the filter 70 and the directional coupler 58 (FIG. 2) that injects the filtered cancellation signal into the receive path in the upstream direction. Thus, in this embodiment, the filtered cancellation signal (including desired component in the desired TX frequency band and the attenuated noise component in the desired RX frequency band) is injected into the receive path in the upstream direction. Then, as described above, the attenuated noise component passes through the RX filter 42 and out the antenna 36. Conversely, the desired component of the cancellation signal in the desired TX frequency band is reflected by the RX filter 42 and then propagates through the receive path in the downstream direction to thereby cancel the transmitter leakage.

Figure 8:
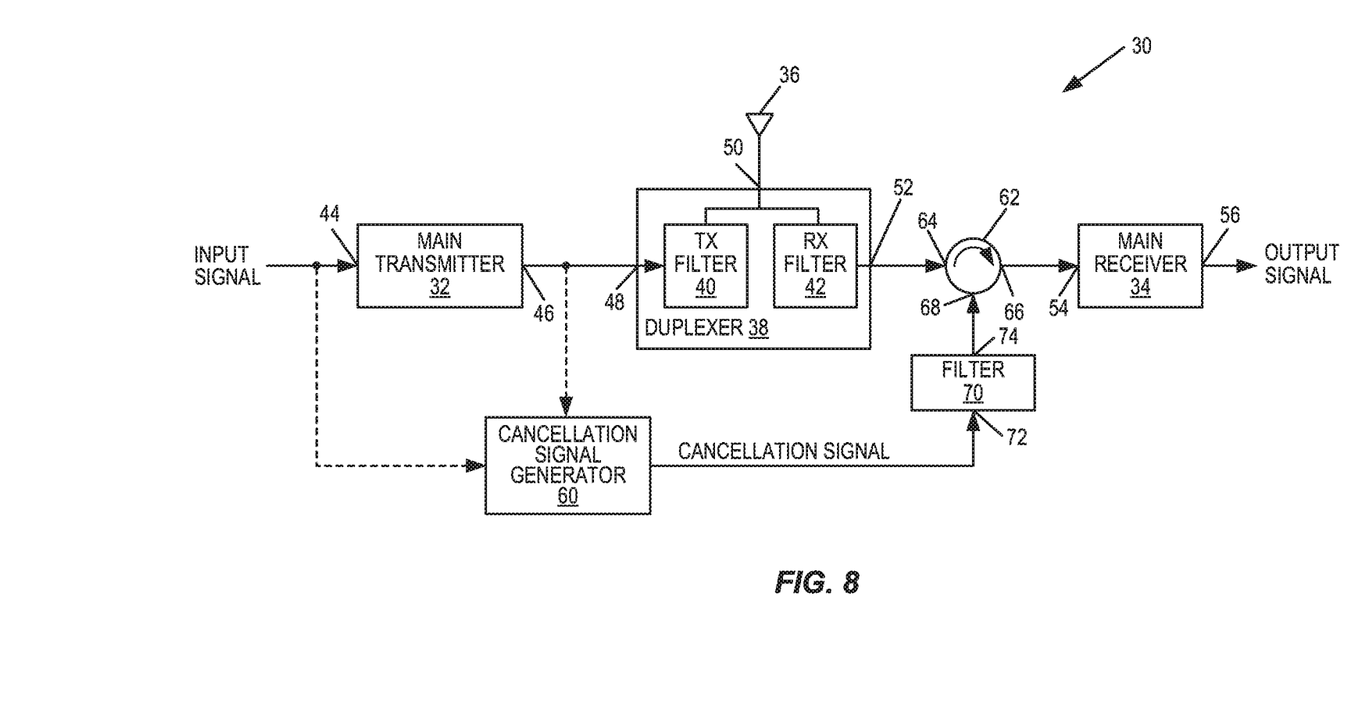
FIG. 8 illustrates a radio system that performs active transmitter leakage cancellation in which a filter is utilized to remove, or mitigate, noise in the transmitter leakage cancellation signal prior to inserting the transmitter leakage cancellation signal into the receive path in an upstream, or reverse, direction according to another embodiment of the present disclosure.

FIG. 8 illustrates yet another embodiment of the radio system 30 that includes both the filter 70 and the circulator 62 (FIG. 4) that injects the filtered cancellation signal into the receive path in the upstream direction. Thus, in this embodiment, the filtered cancellation signal (including desired component in the desired TX frequency band and the attenuated noise component in the desired RX frequency band) is injected into the receive path in the upstream direction. Then, as described above, the attenuated noise component passes through the RX filter 42 and out the antenna 36. Conversely, the desired component of the cancellation signal in the desired TX frequency band is reflected by the RX filter 42 and then propagates through the receive path in the downstream direction to thereby cancel the transmitter leakage.

Figure 9:
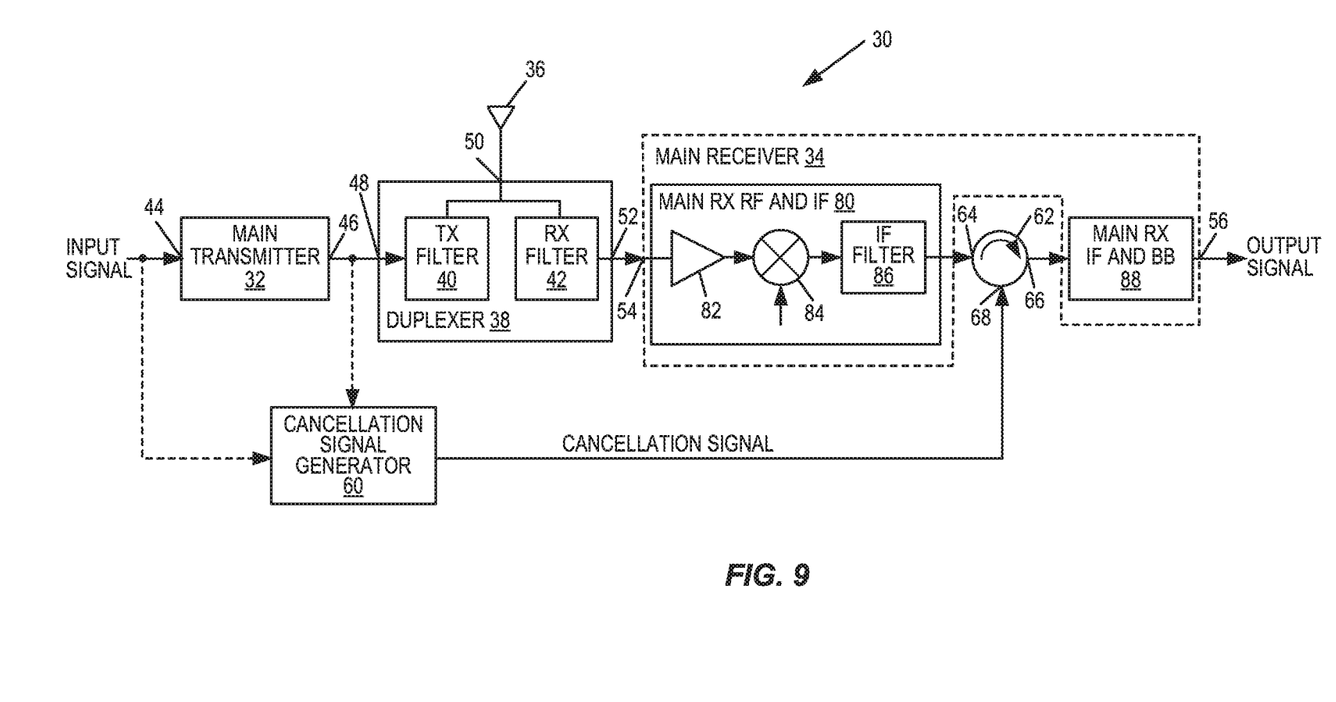
FIG. 9 illustrates a radio system that performs active transmitter leakage cancellation by injecting a transmitter leakage cancellation signal into the receive path in an upstream, or reverse, direction at Intermediate Frequency (IF) according to one embodiment of the present disclosure.

In the embodiments above, the cancellation signal is injected into the receive path between the RX filter 42 of the duplexer 38 and the input 54 of the main receiver 34 (e.g., at RF). However, the cancellation signal may alternatively be injected elsewhere in the receive path (e.g., at Intermediate Frequency (IF) or baseband). When injecting the cancellation signal in the upstream direction, an upstream (preferably immediately upstream) filter that passes the appropriate RX frequency band (e.g., RX frequency band translated to IF or baseband) and reflects the appropriate TX frequency band (e.g., TX frequency band translated to IF or baseband). One example of such an embodiment of the radio system 30 is illustrated in FIG. 9. As illustrated, in this example, the main receiver 34 includes a main receiver RF and IF subsystem 80 including, in this example, an amplifier 82, a mixer 84, and an IF filter 86. In addition, the main receiver 34 includes a main receiver IF and Baseband (BB) subsystem 88.

In this embodiment, the radio system 30 includes the circulator 62, but where the circulator 62 is connected between the main receiver RF and IF subsystem 80 and the main receiver IF and BB subsystem 88. The circulator 62 operates to inject the cancellation signal (which in this embodiment is at IF) in the upstream direction at a point in the receive path between the main receiver RF and IF subsystem 80 and the main receiver IF and BB subsystem 88. In operation, the RF receive signal and transmitter leakage are amplified by the amplifier 82 and downconverted (or frequency translated) from RF to IF by the mixer 84. The resulting IF signals are filtered by the IF filter 86 and then provided to the port 64 of the circulator 62. The cancellation signal is provided to the port 66 of the circulator 62. Notably, while in this embodiment the cancellation signal is not filtered prior to insertion into the receive path, in some embodiments, the cancellation signal may be filtered to remove, or attenuate, the noise component in the desired IF receive frequency band prior to insertion.

The circulator 62 operates such that the cancellation signal is injected into the receive path in the upstream direction. As a result, the noise component of the cancellation signal in the desired IF receive frequency band is passed through the IF filter 86 and attenuated by an output impedance of the mixer 84. Conversely, the desired component of the cancellation signal in the desired IF transmit frequency band (i.e., the desired transmit frequency band after frequency translation from RF to IF) is reflected by the IF filter 86 and then propagated through the receive path in the downstream direction. The IF signals output by the IF filter 86 and the reflected desired component of the cancellation signal are combined and output at the port 66 of the circulator 62 to thereby provide a compensated IF receive signal in which the transmitter leakage has been cancelled. Notably, while the circulator 62 is used in this example, in another embodiment, the directional coupler 58 may be used to inject the cancellation signal into the receive path in the upstream direction at a point between the main receiver RF and IF subsystem 80 and the main receiver IF and BB subsystem 88.

Figure 10:
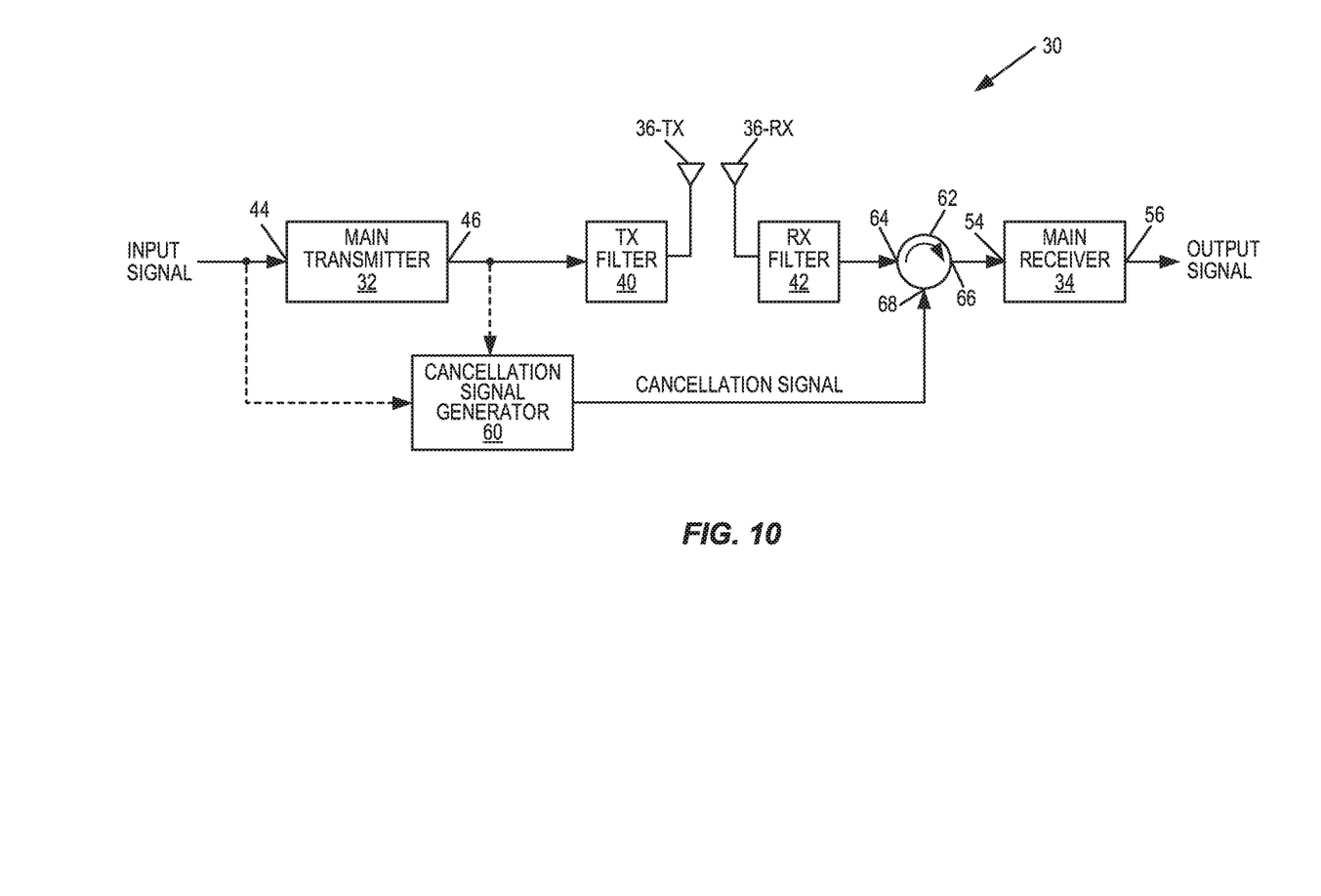
FIG. 10 illustrates a radio system that that includes separate transmit and receive antennas, where the radio system performs active transmitter leakage cancellation by injecting a transmitter leakage cancellation signal into the receive path in an upstream, or reverse, direction according to one embodiment of the present disclosure.

In the embodiments above, the radio system 30 includes the duplexer 38 that enables the sharing of the antenna 36 by the main transmitter 32 and the main receiver 34. However, the present disclosure is not limited thereto. In other embodiments, the main transmitter 32 and the main receiver 34 may use different antennas (referred to as a transmit antenna 36-TX and a receive antenna 36-RX, respectively). In this case, the transmitter leakage may be, e.g., leakage from the transmit antenna 36-TX to the receive antenna 36-RX. In this regard, FIG. 10 illustrates one embodiment of the radio system 30 in which the radio system 30 includes separate transmit and receive antennas 36-TX and 36-RX. Otherwise, in this example, the radio system 30 operates as described with respect to the embodiment of FIG. 4. However, in the same manner, any of the other embodiments described above may alternatively use separate transmit and receive antennas 36-TX and 36-RX.

Figure 11:
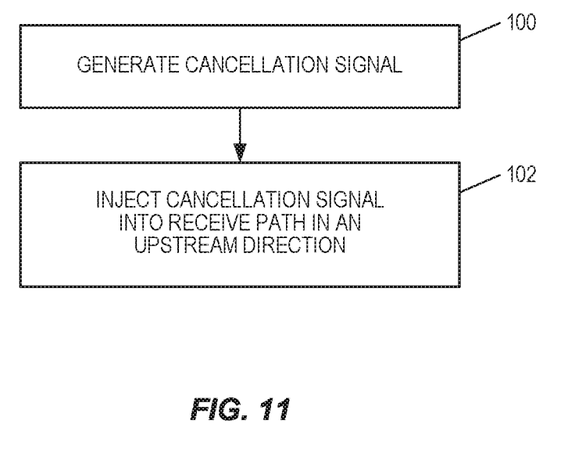
FIG. 11 is a flow chart that illustrates a process for active transmitter leakage cancellation according to one embodiment of the present disclosure.

FIG. 11 is a flow chart that illustrates an active transmitter leakage cancellation process according to one embodiment of the present disclosure. As illustrated, a cancellation signal is generated (step 100). As discussed above, the cancellation signal is generated by a suitable cancellation signal generator (e.g., a digital FIR filter and an auxiliary transmitter). The cancellation signal is then injected into the receive path in the upstream direction toward an RX filter (e.g., the RX filter 42 at RF or the IF filter 86 at IF) (step 102). As discussed above, the cancellation signal may be injected by, e.g., a directional coupler or a circulator. The cancellation signal can be inserted at any desired point in the receive path (e.g., RF, IF, or BB). Further, in some embodiments, the cancellation signal is filtered prior to insertion to remove, or attenuate, the undesired noise component in the RX frequency band.

The following acronyms are used throughout this disclosure.
ADC Analog-to-Digital Converter
BB Baseband
dB Decibel
DAC Digital-to-Analog Converter
FDD Frequency Division Duplexing
FIR Finite Impulse Response
IF Intermediate Frequency
RF Radio Frequency
RX Receive
TDD Time Division Duplexing
TX Transmit
UE User Equipment Those skilled in the art will recognize improvements and modifications to the embodiments of the present disclosure. All such improvements and modifications are considered within the scope of the concepts disclosed herein and the claims that follow.

What is claimed is:

1. A radio system, comprising:
 a receive path comprising:
  a receive filter in the receive path having a pass-band that corresponds to a desired receive frequency band; and
  injection circuitry downstream of the receive filter in the receive path, the injection circuitry adapted to inject a transmitter leakage cancellation signal into the receive path in an upstream direction such that:
   a noise component of the transmitter leakage cancellation signal in the pass-band of the receive filter passes through the receive filter in the upstream direction; and
   a desired component of the transmitter leakage cancellation signal is reflected by the receive filter and propagated downstream through the receive path; and
 a duplexer coupled to an antenna, wherein the receive filter is a receive filter of the duplexer such that the noise component passes through the receive filter of the duplexer and out the antenna.

2. The radio system of claim 1 further comprising:
 the duplexer further comprising a transmit filter, and an antenna port coupled to the antenna;
 a transmit path comprising:
  the transmit filter; and
  a radio transmitter having an input adapted to receive an input signal and an output coupled to the transmit filter, the radio transmitter adapted to process the input signal to provide a Radio Frequency, RF, transmit signal at the output of the radio transmitter; and
 the receive path further comprising:
  the receive filter;
  the injection circuitry coupled to an output of the receive filter, the injection circuitry adapted to combine the transmitter leakage cancellation signal and a RF receive signal output by the receive filter by injecting the transmitter leakage cancellation signal into the receive path in the upstream direction to thereby provide a compensated RF receive signal; and
  a radio receiver having an input coupled to the injection circuitry and an output, the radio receiver adapted to process the compensated RF receive signal from the injection circuitry to provide an output signal.

3. The radio system of claim 1 wherein the injection circuitry is a directional coupler arranged such that the transmitter leakage cancellation signal is injected into the receive path in the upstream direction.

4. The radio system of claim 3 further comprising a filter adapted to filter the transmitter leakage cancellation signal to remove noise in the desired receive frequency band prior to providing the transmitter leakage cancellation signal to the directional coupler.

5. The radio system of claim 1 wherein the injection circuitry is a circulator arranged such that the transmitter leakage cancellation signal is injected into the receive path in the upstream direction.

6. The radio system of claim 5 further comprising a filter adapted to filter the transmitter leakage cancellation signal to remove noise in the desired receive frequency band prior to providing the transmitter leakage cancellation signal to the circulator.

7. The radio system of claim 1 wherein the receive filter is an Intermediate Frequency, IF, filter.

8. The radio system of claim 7 wherein the receive path further comprises:
a Radio Frequency, RF, to Intermediate Frequency, IF, portion comprising:
amplification circuitry configured to receive an RF receive signal and output an amplified RF receive signal;
downconversion circuitry configured to downconvert the amplified RF receive signal to provide an IF receive signal; and
the IF filter configured to filter the IF receive signal to provide a filtered IF receive signal;
wherein the injection circuitry is coupled to an output of the IF filter and is adapted to combine the filtered IF receive signal and the transmitter leakage cancellation signal by injecting the transmitter leakage cancellation signal in the receive path in the upstream direction toward the IF filter.

9. The radio system of claim 1 wherein the receive path is coupled to a receive antenna that is separate from a transmit antenna of a radio transmitter that is a source of transmitter leakage cancelled by the transmitter leakage cancellation signal.

10. A method for active transmitter leakage cancellation, comprising:
generating a transmitter leakage cancellation signal; and
injecting the transmitter leakage cancellation signal into a receive path in an upstream direction at a point in the receive path that is downstream of a receive filter having a pass-band that corresponds to a desired receive frequency band such that a noise component of the transmitter leakage cancellation signal in the pass-band of the receive filter passes through the receive filter in the upstream direction and a desired component of the transmitter leakage cancellation signal is reflected by the receive filter and propagated downstream through the receive path, wherein the receive filter is a receive filter of a duplexer coupled to an antenna, and injecting the transmitter leakage cancellation signal is such that the noise component passes through the receive filter of the duplexer and out the antenna.

11. The method of claim 10 wherein injecting the transmitter leakage cancellation signal comprises injecting the transmitter leakage cancellation signal via a directional coupler arranged such that the transmitter leakage cancellation signal is injected into the receive path in the upstream direction.

12. The method of claim 11 further comprising filtering the transmitter leakage cancellation signal to remove noise in the desired receive frequency band prior to injecting the transmitter leakage cancellation signal via the directional coupler.

13. The method of claim 10 wherein injecting the transmitter leakage cancellation signal comprises injecting the transmitter leakage cancellation signal via a circulator arranged such that the transmitter leakage cancellation signal is injected into the receive path in the upstream direction.

14. The method of claim 13 further comprising filtering the transmitter leakage cancellation signal to remove noise in the desired receive frequency band prior to injecting the transmitter leakage cancellation signal via the circulator.

15. The method of claim 10 wherein the receive filter is an intermediate frequency, IF, filter.

16. The method of claim 10 wherein the receive path is coupled to a receive antenna that is separate from a transmit antenna of a radio transmitter that is a source of transmitter leakage cancelled by the transmitter leakage cancellation signal.

17. A radio system, comprising:
a receive path;
a transmitter leakage cancellation signal generation subsystem configured to generate a transmitter leakage cancellation signal;
a filter configured to filter the transmitter leakage cancellation signal to remove noise in a desired receive frequency band of the receive path to thereby provide a filtered transmitter leakage cancellation signal, the filter having an output coupled to a point in the receive path such that the filtered transmitter leakage cancellation signal is combined with a receive signal in the receive path to thereby cancel transmitter leakage from a corresponding radio transmitter, wherein the output of the filter is directly connected to the point in the receive path.

18. The radio system of claim 17 wherein the output of the filter is coupled to the point in the receive path via a directional coupler.

* * * * *